(12) United States Patent
Dorranc et al.

(10) Patent No.: US 7,382,913 B2
(45) Date of Patent: Jun. 3, 2008

(54) METHOD AND APPARATUS FOR GUIDING PLACEMENT OF VEHICLE SERVICE FIXTURES

(75) Inventors: Daniel R. Dorranc, Ballwin, MO (US); Timothy A. Strege, Ballwin, MO (US); Leigh R. Burns, Jr., Troy, IL (US); Mark S. Shylanski, University City, MO (US); Thomas J. Golab, St. Peters, MO (US)

(73) Assignee: Hunter Engineering Company, Bridgeton, MO (US)

( * ) Notice: Subject to any disclaimer, the term of this patent is extended or adjusted under 35 U.S.C. 154(b) by 837 days.

(21) Appl. No.: 10/646,644

(22) Filed: Aug. 22, 2003

(65) Prior Publication Data

US 2005/0041847 A1    Feb. 24, 2005

(51) Int. Cl.
*G06K 9/00* (2006.01)
(52) U.S. Cl. .................. 382/151; 29/273; 33/203.18; 356/155
(58) Field of Classification Search ............... 382/103, 382/141, 151, 142, 143, 116, 154; 364/559; 348/94, 95; 29/273; 33/288, 203, 203.15, 33/203.18; 356/138, 139, 152, 153, 155, 356/139.09
See application file for complete search history.

(56) References Cited

U.S. PATENT DOCUMENTS

RE33,144 E      1/1990   Hunter et al.
5,488,472 A *   1/1996   January ............ 356/139.09
5,586,062 A *  12/1996   Colarelli, III ........... 700/279
5,675,515 A *  10/1997   January ................... 700/279
5,724,128 A *   3/1998   January ............ 356/139.09
5,870,315 A *   2/1999   January ................... 700/279
5,920,281 A     7/1999   Grace
6,020,844 A     2/2000   Bai et al.
6,043,875 A     3/2000   Samuelsson
6,064,750 A *   5/2000   January et al. ........... 382/103
6,087,995 A     7/2000   Grace et al.
6,134,792 A    10/2000   January
6,363,619 B1    4/2002   Schirmer et al.
6,583,868 B2    6/2003   Hopfenmuller
6,636,172 B1   10/2003   Prestl et al.
6,728,609 B2 *  4/2004   Murray et al. ............ 701/29
6,731,382 B2 *  5/2004   Jackson et al. ...... 356/139.09
6,823,601 B2   11/2004   Murray (Continued)

FOREIGN PATENT DOCUMENTS

DE           19642811         4/1998

(Continued)

OTHER PUBLICATIONS

Autotechnica Belgium—Truck Cam—Camera Wheel Alignment System—Apr. 20, 2002 2 pages.

*Primary Examiner*—Sheela Chawan
(74) *Attorney, Agent, or Firm*—Polster, Lieder, Woodruff & Lucchesi, L.C.

(57) ABSTRACT

A machine vision system is configured to facilitate placement of a vehicle service apparatus relative to an associated vehicle. The machine vision system is configured to utilize images of optical targets received from one or more cameras to guide the placement of the vehicle service apparatus relative to the associated vehicle.

11 Claims, 5 Drawing Sheets

U.S. PATENT DOCUMENTS

| | | |
|---|---|---|
| 2002/0105456 A1 | 8/2002 | Isaji |
| 2004/0049930 A1 | 3/2004 | Murray |
| 2005/0096807 A1 | 5/2005 | Murray et al. |

FOREIGN PATENT DOCUMENTS

| | | |
|---|---|---|
| DE | 19857871 | 10/2000 |
| DE | 10114799 | 10/2002 |
| EP | 1231480 A2 | 8/2002 |
| EP | 1231480 A3 | 8/2002 |
| EP | 1260832 | 11/2002 |
| EP | 0984297 | 3/2003 |
| EP | 0905526 | 12/2003 |
| WO | 2004 102114 | 11/2004 |

* cited by examiner

METHOD AND APPARATUS FOR GUIDING PLACEMENT OF VEHICLE SERVICE FIXTURES

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to the alignment of vehicle components relative to one or more features of a vehicle, and in particular, to methods and apparatus for adjusting the alignment of vehicle collision avoidance systems with the travel direction of the vehicle using machine vision components.

Machine vision vehicle wheel alignment systems have been in use by the vehicle service industry for several years. A typical machine vision vehicle wheel alignment system, such as the Series 811 wheel alignment system, configured with the DSP600 sensors manufactured by Hunter Engineering Co. of Bridgeton, Mo. consists of a console unit, cameras, and optical targets. The console unit contains a computer configured with image processing and vehicle wheel alignment software applications, and incorporates various operator interfaces, including a keyboard, a mouse, a printer, and a display device. The cameras are coupled to the computer, and the optical targets are disposed in the field of view of the cameras, typically mounted to the wheels of a vehicle undergoing an alignment inspection.

Commonly, to view the left and right sides of a vehicle, two or more cameras are disposed on opposite sides of the vehicle, each having a field of view encompassing one or more wheels of the vehicle. In alternative configurations, two cameras are provided on each side of the vehicle, each having a field of view encompassing a single vehicle wheel, i.e. a left front, left rear, right front, and right rear wheel, respectively. To facilitate vehicle wheel alignment, optical targets are mounted on the vehicle wheels, and observed by the cameras. The optical targets preferably have predetermined features which are identified in images obtained by the cameras, and which facilitate a determination of the position and orientation of the optical targets. The image processing may either take place in the camera modules, or in the console computer. Once the position and orientation of each optical target is determined, the position and orientation of the associated vehicle wheel can be determined, and corresponding, the various vehicle wheel alignment angle measurements may be either determined or calculated. These angles typically include camber, caster, and toe angles for each vehicle wheel, the vehicle centerline, and the vehicle rear thrust line.

It is becoming increasingly common for automotive vehicles to be equipped with adaptive cruise control systems which include forward-looking collision avoidance radar components. Collision avoidance radar components, such as those manufactured by Robert Bosch GmbH of Germany, typically operate in either a frequency modulation (FM) or continuous wave (CW) mode to transmit a signal from an antenna typically located in the front grill area of an automobile. The collision avoidance radar then determines from the return signal received by the antenna a distance an object causing the return signal is located from the automobile and the rate of closure of the object. Systems in the United States of America are currently configured to operate within a 76-77 GHz frequency band allocated by the Federal Communications Commission (FCC) for collision avoidance radar systems. However, other collision avoidance systems may be constructed which operate within different portions of the electromagnetic spectrum, for example, utilizing infrared or visible light lasers to obtain information about objects in the path of a vehicle, or alternatively, utilizing ultrasonic signals.

To obtain an accurate measure of the distance between the vehicle on which the collision avoidance components are mounted and an object from which emitted radar or laser signals are reflected, it is necessary to ensure that the emitted signals are transmitted along the same vector as the vehicle is traveling, which is typically the vehicle rear thrust line for straight-line motion. Any misalignment between the transmission vector and the direction of vehicle travel may result in misidentification of approaching objects, a miscalculation of the distances between the vehicle and the object, and accordingly, a miscalculation of the rate of closure between the two. Depending upon the severity of the miscalculation, the collision avoidance components might fail to recognize an impending collision, or in the case of adaptive cruise control systems, might signal a reduction in vehicle speed which is less than that which is required to safely avoid a collision.

Conventionally, the manufacturer of the vehicle collision avoidance system provides a vehicle service apparatus specifically designed to facilitate the alignment of the signal emitting and receiving components. Examples of vehicle service apparatus designed to facilitate the alignment of collision avoidance systems can be found in U.S. Pat. No. 6,363,619 B1 to Schrimer et al. and in U.S. Pat. No. 6,583,868 B1 to Hopfenmuller. Typically, a collision avoidance system alignment fixture is placed in front of the vehicle, and configured with components to facilitate a precise placement relative to the vehicle. These may include alignment marks onto which lasers are projected from vehicle mounted laser pointers, i.e., as shown in the '868 Hopfenmuller patent, or alignment mirrors as shown in the '619 Schrimer et al. patent. Alternatively, the collision avoidance system alignment fixture may include mounting points for traditional transducer-based vehicle wheel alignment sensor heads. Preferably, these mounting points are perpendicularly disposed to a steer axis of the collision avoidance system alignment fixture, generally defined by as the centerline of the fixture. The mounting points are preferably spaced apart from the collision avoidance system alignment fixture on extension arms, such that each is approximately disposed outward of the vehicle's sides to facilitate reference to similar sensor heads attached to the vehicle wheels.

Once the vehicle wheels have been properly aligned, or the vehicle wheel alignment angles including the rear thrust line have been measured with the traditional transducer based vehicle wheel alignment sensor heads, wheel alignment sensor heads are removed from the front wheels of the vehicle, and placed on the mounting points on the collision avoidance system alignment fixture. With the mounting points disposed outward of the vehicle's sides, the traditional transducer-based vehicle wheel alignment sensor heads removed from the front wheels may still cooperate with the vehicle wheel alignment sensor units which remain mounted to the rear wheels of the vehicle to determine a relative alignment between the collision avoidance system alignment fixture and the vehicle rear thrust line.

Accordingly, it would be highly advantageous to facilitate the placement of alignment fixtures of a vehicle collision avoidance system relative to the direction of travel of the associated vehicle, using components of a machine vision vehicle wheel alignment system, thereby eliminating the need for vehicle service centers to either delay acquiring machine vision vehicle wheel alignment systems or maintain both a machine vision vehicle wheel alignment system and a conventional transducer-based vehicle wheel alignment system for purposes of aligning vehicle collision avoidance systems.

It would be further highly advantageous in some applications to facilitate the placement of a vehicle service apparatus, such as a headlight aiming device or sensing devices for providing driving assistance such as Intelligent Vehicle Highway Systems, relative to an associated vehicle undergoing a vehicle service procedure using components of a machine vision vehicle wheel alignment system, thereby eliminating the need for additional or supplemental alignment equipment or procedures.

BRIEF SUMMARY OF THE INVENTION

Briefly stated, in a preferred embodiment, a machine vision vehicle wheel alignment system is operatively coupled with one or more cameras mounted to a vehicle service apparatus to facilitate placement of the vehicle service apparatus relative to an associated vehicle. The cameras are mounted to the vehicle service apparatus such that one or more optical targets mounted to the wheels of the associated vehicle are in a corresponding field of view. The vehicle wheel alignment system is configured to utilize data from images acquired by the cameras to guide the placement of the vehicle service apparatus relative to the associated vehicle.

In an alternate embodiment, a machine vision vehicle wheel alignment system is configured to observe one or more optical targets mounted to a vehicle service apparatus. The vehicle wheel alignment system is configured to utilize data from images of the optical targets on the vehicle service apparatus, in conjunction with images of optical targets mounted to the vehicle wheels, to facilitate placement of the vehicle service apparatus relative to the vehicle.

In an alternate embodiment, a machine vision vehicle wheel alignment system is operatively coupled with one or more cameras mounted to a collision avoidance system alignment fixture to facilitate positioning of the collision avoidance system alignment fixture relative to the rear thrust line of an associated vehicle. The cameras are mounted to the collision avoidance system alignment fixture such that one or more optical targets mounted to the rear wheels of the associated vehicle are in a corresponding field of view. The vehicle wheel alignment system is configured to utilize data from images acquired by the cameras to guide the placement of the collision avoidance system alignment fixture relative to the rear thrust line of the associated vehicle.

In an alternate embodiment, a machine vision vehicle wheel alignment system is configured to observe one or more optical targets mounted to a collision avoidance system alignment fixture. The vehicle wheel alignment system is configured to utilize data from images of the optical targets mounted to the fixture, in conjunction with images of optical targets mounted to the rear wheels of the associated vehicle, to facilitate placement of the collision avoidance system alignment fixture relative to the rear thrust line of an associated vehicle.

A method of the present invention for guiding the placement of a vehicle service apparatus relative to an associated vehicle includes the steps of mounting one or more optical targets on the associated vehicle and mounting one or more cameras on the vehicle service apparatus such that the optical targets are in the field of view of the one or more cameras. Images from the one or more cameras are processed to guide the placement of the vehicle service apparatus relative to the associated vehicle.

An alternate method of the present invention for guiding the placement of a vehicle service apparatus relative to an associated vehicle includes the steps of mounting one or more optical targets on the associated vehicle and one or more optical targets on the vehicle service apparatus such that each of the optical targets is in the field of view of one or more cameras associated with an optical vehicle wheel alignment system. Images of the targets on the associated vehicle and on the vehicle service apparatus acquired by the one or more cameras are processed to guide the placement of the vehicle service apparatus relative to the associated vehicle.

In an alternate embodiment, machine vision components including cameras and optical targets are operatively coupled to a vehicle and to a vehicle service apparatus to facilitate placement of the vehicle service apparatus relative to the vehicle. A positioning guidance system is configured to utilize data from images acquired by the cameras to guide the placement of the vehicle service apparatus relative to the associated vehicle.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
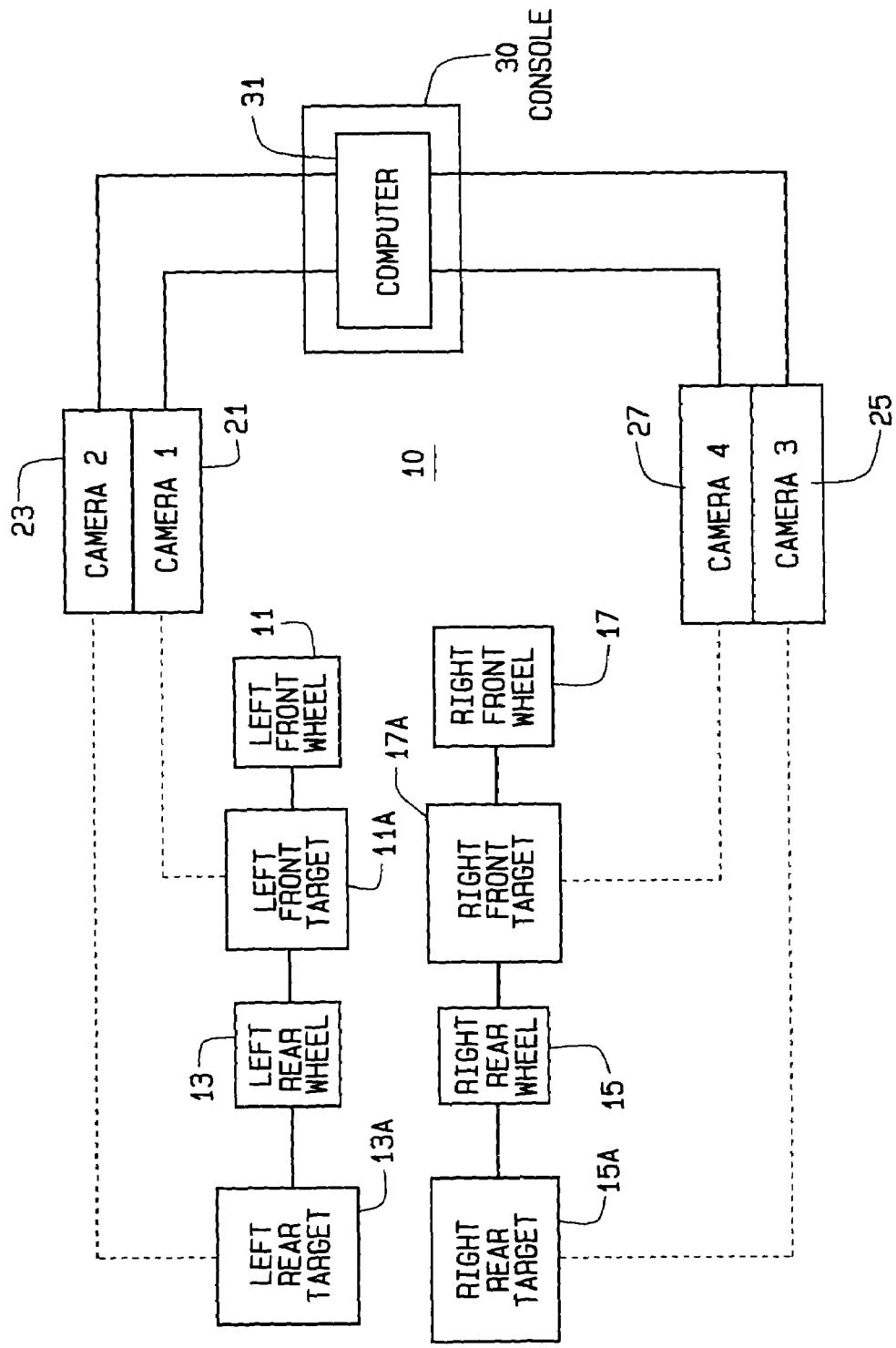
FIG. 1 is a block diagram of a prior art optical vehicle wheel alignment system.

Turning to FIG. 1, the basic components of a conventional machine vision vehicle wheel alignment system, such as the Series 811 Aligner with the DSP600 sensors from Hunter Engineering Co. of Bridgeton, Mo. are shown generally at 10. The system 10 is configured to determine the position and orientation of vehicle wheels 11, 13, 15, and 17, and the axis about which they roll. Each vehicle wheel has associated therewith one or more optical targets 11A, 13A, 15A, and 17A. Optionally, additional optical targets may be associated other components of the vehicle, with a lift rack, or other support structure on which the vehicle wheels rest. The images of the optical targets are preferably obtained by four cameras 21, 23, 25, and 27, with one camera associated with each wheel. The optical paths between the targets and the corresponding cameras are illustrated by the dashed lines in FIG. 1. Those of ordinary skill in the art will recognize that the number of cameras may be varied, provided that images of each optical target are obtained and processed by the system.

The signals from the cameras are supplied to the wheel alignment system console, and in particular, to a computer 31 disposed within the console. The computer is configured with software to utilize data from the acquired images to determine various wheel alignment angles. The process of calculating the alignment angles may be done in many ways, such as shown in U.S. Pat. Nos. 5,488,472, 5,870,315, 5,675,515, and 5,724,128, the disclosures of which are herein incorporated by reference. Correspondingly, methods and procedures for processing images of optical targets to establish coordinate reference systems, identify positions and orientations within those systems, transform data between established coordinate reference systems, and to determine alignment measurements are well known to those of ordinary skill in the art of machine vision vehicle wheel alignment, and are shown in U.S. Pat. No. 6,064,750 to January et al., and U.S. Pat. No. 6,134,792 to January, the disclosures of which are herein incorporated by reference.

Figure 2:
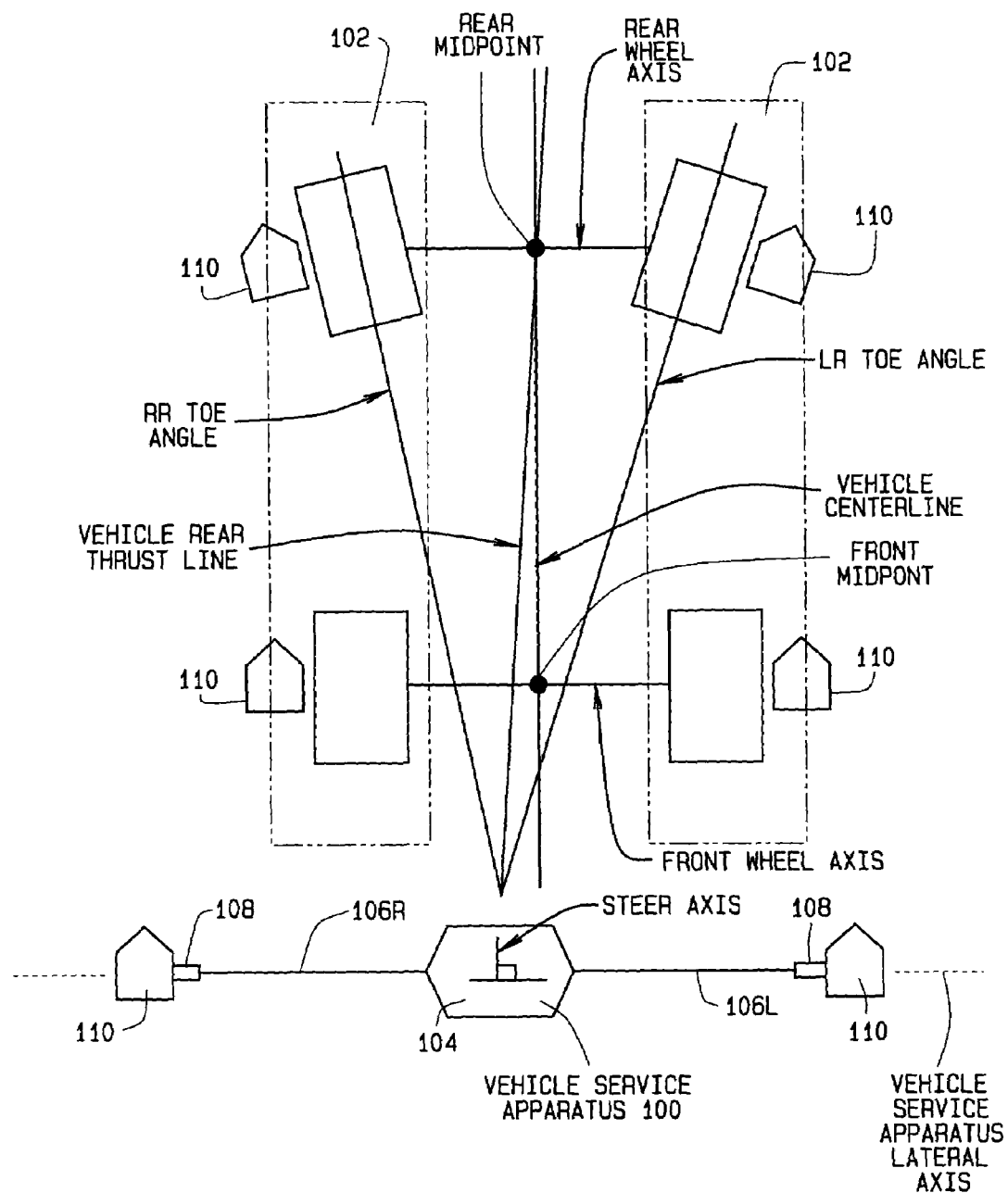
FIG. 2 is a simplified illustration of vehicle wheel alignment angles and the placement of a vehicle service apparatus.

Turning to FIG. 2, a vehicle service apparatus 100 which is to be positioned relative to a vehicle is shown in front of a vehicle lift rack 102 consisting of left and right lift ramps upon which a vehicle is disposed. The vehicle service apparatus 100 may consist of a housing 104, and includes a pair of extension bars 106R and 106L which extend laterally from the housing 104. The extension bars 106R and 106L have a common lateral axis, and are fixed relative to the housing 104. A longitudinal axis through the housing 104, referred to as the steer axis, is perpendicular to the common lateral axis of the extension bars 106R and 106L. Disposed at the outward ends of each of the extension bars 106R and 106L are sockets 108, each configured to receive an alignment component 110. Preferably, each alignment component 110 is a camera 112, however, in an alternate embodiment discussed below, each alignment component 110 consists of an optical target 114 such as conventional optical targets 11A, 13A, 15A, or 17A. Corresponding alignment components 110, which may consist of either cameras 112 or optical targets 114, depending upon the particular configuration of the vehicle service apparatus 100 as discussed below, are secured to the vehicle wheels as required to cooperate with the alignment components 110 on the extension bars 106R, 106L.

Figure 3:
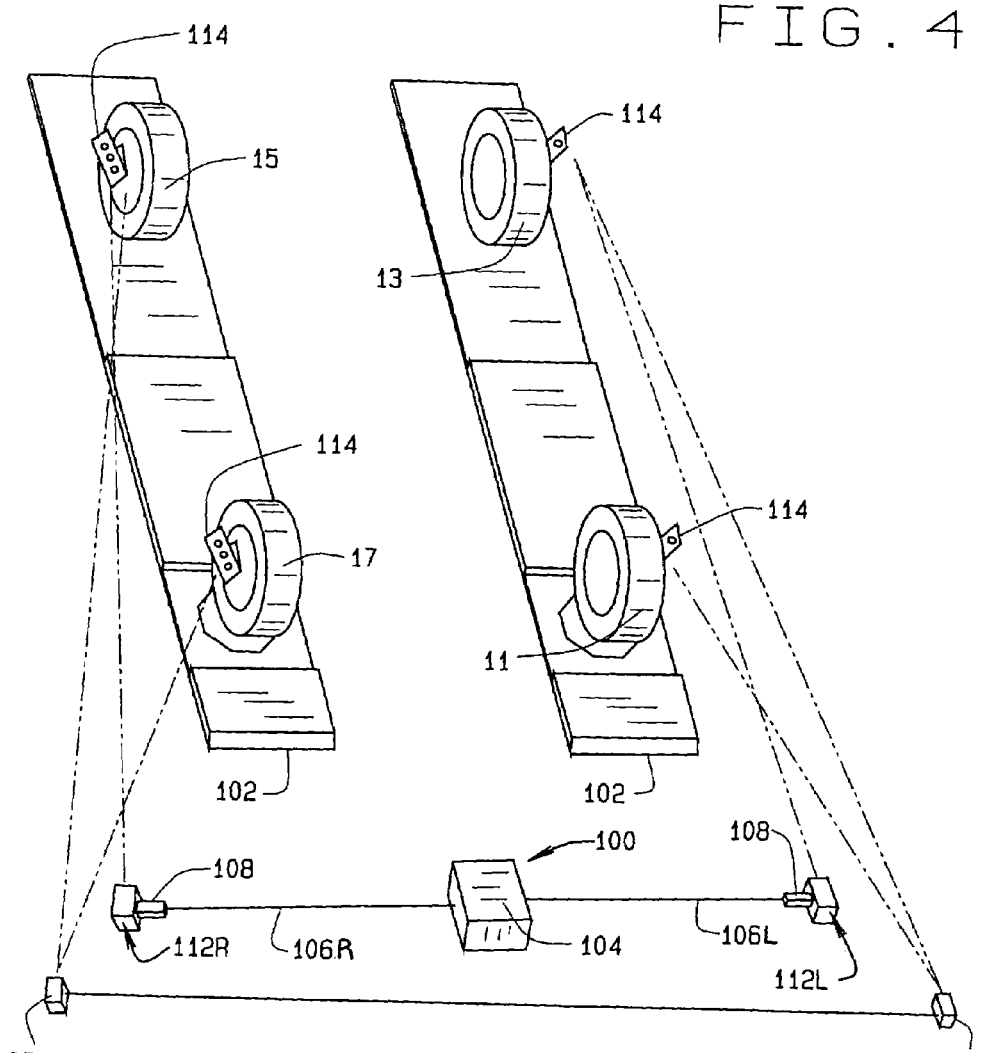
FIG. 3 is a perspective illustration of the placement of vehicle wheel alignment system cameras and vehicle service apparatus cameras relative to optical targets disposed on the vehicle.

Turning to a first embodiment of the present invention, shown in FIG. 3, cameras 112 are secured to the sockets 108 on each extension bar 106R and 106L. Each camera 112 is positioned and oriented to have a field of view which includes at least one optical target 114 secured to a vehicle wheel as required to carry out measurements of vehicle wheel alignment. Preferably, the camera 112 secured to the extension bar 106R on the right side of the vehicle is positioned and oriented such that the target 114 on the right rear wheel 15 of the vehicle is within the field of view of the camera. Correspondingly, the camera 112 secured to the extension bar 106L on the left side of the vehicle is positioned and oriented such that the target 114 on the left rear wheel 13 is within the field of view of the camera. Those of ordinary skill in the art will recognize that removal of targets 114 from the front left and right vehicle wheels 11 and 17 may be required to provide a clear field of view of the targets 114 on the rear left and right wheels 13, 15 to the cameras 112.

Each camera 112 is operatively coupled to the computer 31 in the wheel alignment system console 30 using conventional communications components, such as a connecting cable capable of transmitting signals, or via wireless communications link. For example, each camera 112 may utilize the same style cable and connector as the conventional wheel alignment cameras 21, 23, 25, and 27.

The computer 31 is configured with software to process the data received from each camera 112 to determine a spatial relationship between each camera 112 and an optical target 114 present in an associated field of view. The computer 31 is further configured to utilize the determined spatial relationships and data previously acquired from the cameras 21, 23, 25, and 27 related to the position and orientation of the targets 114 on each vehicle wheel, to guide the operator to adjust the placement of the vehicle service apparatus 100 to the manufacturer's recommended position and orientation relative to the vehicle. For example, the position and orientation of the vehicle service apparatus 100 may be aligned such that the steer axis of the vehicle service apparatus 100, as defined by a line perpendicular to the common axis of the extension bars 106R and 106L, is aligned with the rear thrust line of the vehicle (shown in FIG. 2). Generally, it is not required that the steer axis be aligned collinearly with the rear thrust line, so long as the steer axis and the rear thrust line are parallel.

Figure 4:
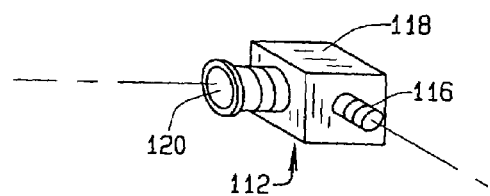
FIG. 4 is a perspective illustration of a portable camera unit having a mounting shaft.

For cameras 112 which are removable from the sockets 108, such as for attachment to other vehicle service apparatus, it is preferable that the camera 112 have a fixed stub (mounting) shaft 116 secured to the body 118, as seen in FIG. 4. Prior to use, it is necessary to determine the relationship between the fixed stub (mounting) shaft 116 axis of rotation and the axis of the camera lens 120, i.e., the camera coordinate reference system. One method for determining the direction vector of the shaft in the camera coordinate reference system is to position an optical target 114 in the field of view of the camera. Images of the optical target 114 are acquired with the camera secured in a first rotational position about the fixed stub (mounting) shaft 116, and with the camera secured in a second rotation position about the fixed stub shaft. Using known mathematical transformations, such as described in U.S. Pat. No. 5,724,128 to January, the position and direction of the rotational axis of the camera about the fixed mounting shaft 116, relative to the coordinate system of the camera lens 120, can be determined and stored for use as a calibration value.

Figure 5:
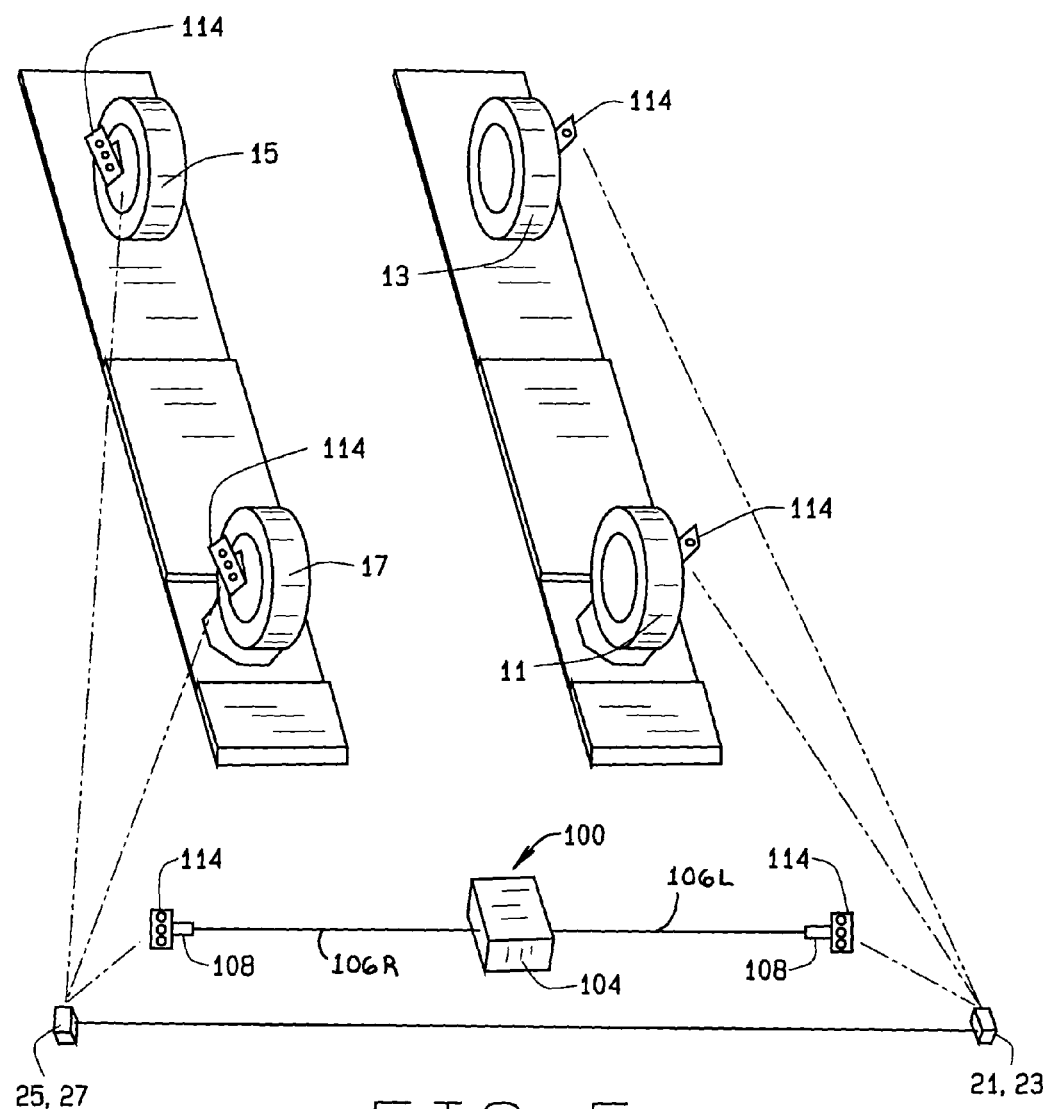
FIG. 5 is a perspective illustration of the placement of vehicle wheel alignment system cameras and optical targets disposed on the vehicle and on the vehicle service apparatus.

In an alternate embodiment of the present invention shown in FIG. 5, each alignment component 110 secured to the extension arms 106R and 106L is an optical target 114 instead of a camera 112. Each optical target 114 on the extension arms 106R, 106L is disposed within the field of view of at least one camera associated with the vehicle wheel alignment system, such as cameras 21, 23, 25, or 27. These cameras may have wide fields of view which encompass both the optical targets 114 mounted to the vehicle wheels 11, 13, 15, 17, and the optical targets 114 mounted to the extension arms 106R, 106L or alternatively, may have fields of view which are adjustable, such as through movement of the cameras to selectively view either the optical targets 114 mounted to the vehicle wheels 11, 13, 15, 17 or the optical target 114 secured to the extension bars 106R, 106L. Alternatively, the vehicle wheel alignment system may be configured with one or more additional cameras (not shown) oriented to view the approximate location of each of the optical targets 114 secured to the extension bars 106R, 106L. The wheel alignment computer 31 is configured with software to process the data received from the cameras viewing each of the optical targets 114, to determine a spatial relationship between each optical target 114, i.e., between the vehicle and the vehicle service apparatus 100.

The number of optical targets 114 required to align the vehicle service apparatus 100 is dependent upon several factors, including the desired accuracy with which the vehicle service apparatus 100 is to be aligned, and the quality of the apparatus itself, such as the extension bars 106R, 106L and sockets 108 used to attached the optical targets 114 to the vehicle service apparatus 100. For example, for collision avoidance system applications, the vehicle service apparatus manufacturers may provide precisely machined sockets 108 which have a fixed and known relationship (typically normal) to the housing 104 of the vehicle service apparatus 100. For these applications, only one optical target 114 is required, because the relationship between the target mounting in the socket 108 and the housing 104 is known. Alternatively, if the sockets 108 are not precisely machined, or are not in a known relationship to the housing 104, two optical targets 114 are utilized to define a steer axis for the vehicle service apparatus 100 which may be aligned relative to one or more vehicle wheel alignment angles. Those of ordinary skill in the art will recognize that it may be necessary to rotate the optical targets 114 within the sockets 108 to two or more positions, and to acquire images of the optical targets 114 in each rotational position, thereby acquiring sufficient information to identify an axis of rotation of the optical targets, and correspondingly, an axis of the extension bar 106R or 106L.

The wheel alignment computer 31 is configured to utilize the determined spatial relationships and data previously acquired from the cameras 21, 23, 25, and 27 related to the position and orientation of the optical targets 114, to guide the operator to adjust the current position and orientation of the vehicle service apparatus 100 to the manufacturer's recommended placement. For example, the position and orientation of the vehicle service apparatus 100 may be adjusted such that a steer axis of the vehicle service apparatus 100 is parallel with the rear thrust line of the vehicle. Alternatively, those of ordinary skill in the art will recognize that it is functionally equivalent to first determine a relationship between the vehicle front and rear thrust lines, and to then adjust the position of the vehicle service apparatus 100 relative to the front thrust line of the vehicle, compensating for any front to rear variation. This assumes that the position and orientation of the front wheels is not changed after the relationship to the rear thrust line is determined.

As a method for aligning a vehicle service apparatus 100 relative to a vehicle, the present invention requires that an operator initially utilize a machine vision vehicle wheel alignment system in a conventional manner to acquire one or more alignment measurements associated with the vehicle. Typically, conventional operation of a machine vision vehicle wheel alignment system requires that a set of optical targets 114 be mounted to the vehicle wheels 11, 13, 15, and 17. Images of the optical targets are then acquired by one or more cameras 21, 23, 25, and 27 and processed to obtain measurements of the associated wheel alignment angles for the vehicle. When positioning a vehicle service apparatus 100, such as a radar alignment fixture, the vehicle service apparatus 100 must be aligned to the direction of travel for the vehicle, accordingly, it is necessary to obtain a measurement of the vehicle rear thrust line, which is representative of the direction of travel for the vehicle.

Once the vehicle wheel alignment measurements have been completed, the operator initiates the alignment of the vehicle service apparatus 100, preferably by selecting a software option presented by the vehicle wheel alignment computer 31. Upon initiation of the vehicle service apparatus alignment, the computer 31 preferably computes the necessary vehicle wheel alignment angles and reference points in a three dimensional coordinate system defined by one of the optical targets 114 mounted to the vehicle rear wheels 13, 15. The computer 31 further computes a representation of the relationship between each of the optical targets 114. While the remaining steps of the method are described in the context of utilizing optical targets 114 secured to the rear wheels 13, 15 of a vehicle, those of ordinary skill in the art will recognize that if the vehicle service apparatus 100 is to be placed relative to the front thrust line of the vehicle, after a vehicle alignment has been completed, the computer 31 will utilize the optical targets 114 secured to the front wheels 11, 17 and associated measurements or compensation values.

Next, the operator is instructed to remove optical targets 114 from the front vehicle wheels 11 and 17, if required to provide a clear field of view to the optical targets 114 on the rear wheels 13, 15, and to mount cameras 112 to the extension bars 106R and 106L of the vehicle service apparatus 100. The vehicle service apparatus 100 is positioned in front of the vehicle, at approximately the vehicle centerline, such that the optical targets 114 on the rear vehicle wheels 13, 15 are each within the field of a camera 112. The position and orientation of the cameras 112 is locked, and the cameras 112 are operatively connected to the computer 31 using a conventional connector such as a communications cable or wireless communications link.

Images acquired from each camera 112 of the optical targets 114 secured to the rear wheels 13, 15 are compared with the previously computed target relationships and wheel alignment angles to determine the position and orientation of the vehicle service apparatus 100 in a common coordinate system. Preferably, a common axis between the two cameras 112 is established perpendicular to a steer axis for the vehicle service apparatus 100. Once the position and orientation of the vehicle service apparatus 100 is identified, the computer 31 provides the operator with instructions for adjusting the position and orientation of the vehicle service apparatus 100 such that the steer axis or other feature of the vehicle service apparatus 100 is aligned or positioned relative to a predetermined vehicle wheel alignment angle or other measurement, such as the rear wheel thrust line.

Those of ordinary skill in the art will recognize that the instructions may be provided in numerical format, or may be provided visually, such as through a "live" bar graph representative of the amount of movement required to position the vehicle service apparatus 100 in the desired location. With the vehicle service apparatus 100 disposed at the desired position and orientation relative to the vehicle, the operator can conduct further necessary vehicle services, such as the alignment of a radar collision avoidance unit, in the conventional manner.

Figure 6:
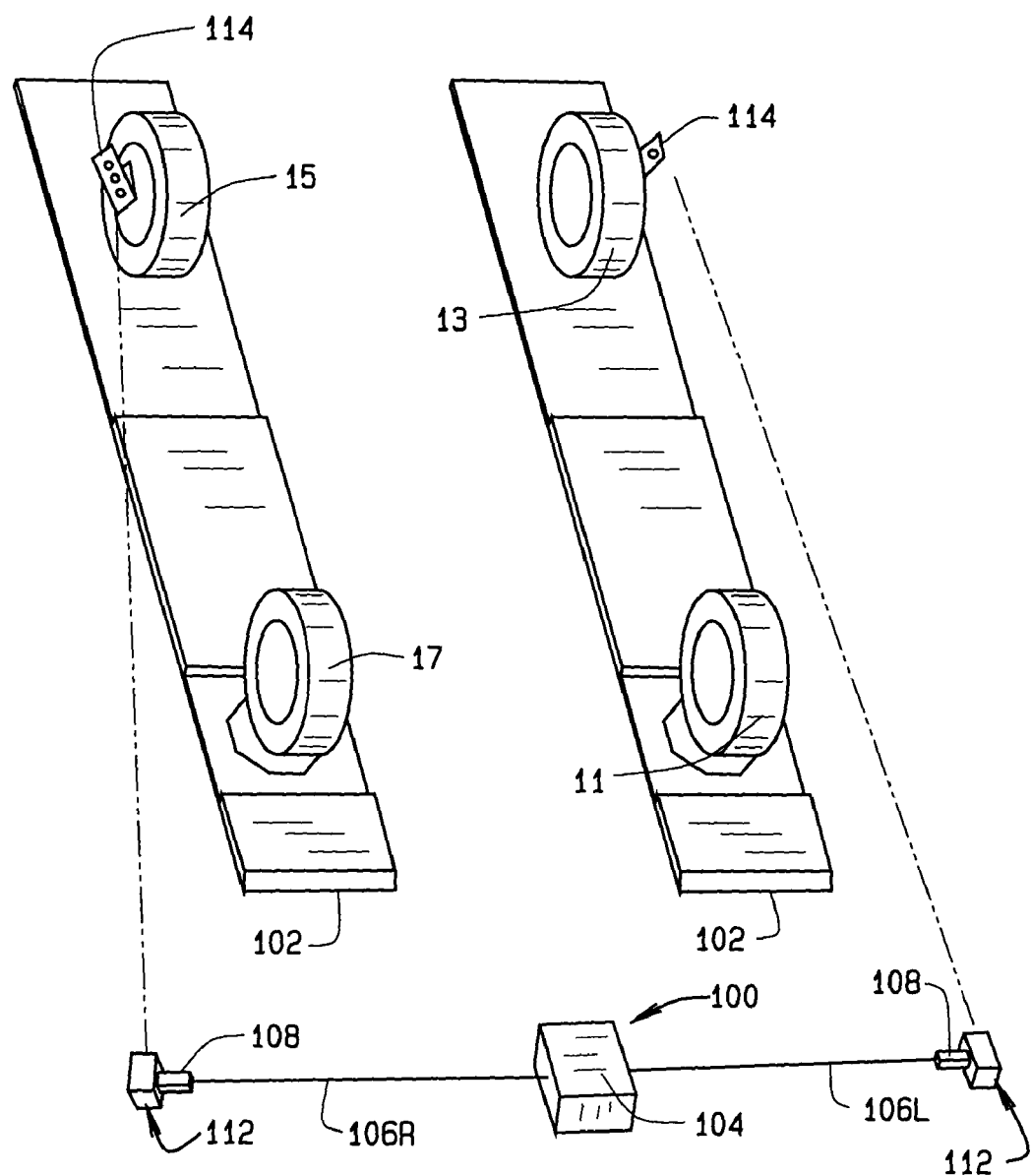
FIG. 6 is a perspective illustration of the placement of vehicle service apparatus cameras relative to optical targets disposed on the vehicle.

Turning to FIG. 6, an alternate method of the present invention for aligning a vehicle service apparatus 100 relative to the rear thrust line of a vehicle does not require that a machine vision system acquire measurements of actual vehicle wheel alignment angles prior to the positioning of the vehicle service apparatus, and does not require that a common coordinate system be established between the left and right sides of the vehicle. Conventionally, a vehicle rear thrust angle is defined as (Left Rear Toe−Right Rear Toe)÷2. Correspondingly, a vehicle front thrust angle is defined as (Left Front Toe−Right Front Toe)÷2. Substituting in the equations set forth above, it can be shown that for the rear thrust angle and a front thrust angle to be equal, the following condition must be satisfied: (Left Rear Toe−Left Front Toe)=(Right Rear Toe−Right Front Toe). In summary, if the difference between the front and rear toe angles on each side of the vehicle is equal, the front and rear thrust lines are aligned with respect to each other.

A vehicle service apparatus is aligned with respect to the rear thrust line of a vehicle when the steer axis of the vehicle service apparatus 100 and the rear thrust line are the same or parallel, i.e. when the angle of the rear thrust line minus the angle for the steer axis=0. Since the vehicle service apparatus steer axis can be treated as an equivalent to a front thrust line, it becomes apparent that the vehicle service apparatus 100 may be aligned with respect to the rear thrust line of the vehicle by comparing the angular variation between the left rear wheel rotation axis of the vehicle and the left side of the vehicle service apparatus 100 with the right rear wheel rotational axis of the vehicle and the right side of the vehicle service apparatus. Comparison of the left and right rear wheel rotational axis with the left and right sides of the vehicle service apparatus 100, such as represented by left and right camera mounting shaft axes of rotation, does not need to be conducted in a common coordinate system or reference frame.

Accordingly, an alternate method of the present invention utilizes the angular relationships between the left and right sides of the vehicle to align the vehicle service apparatus 100 relative to the rear thrust line of the vehicle. First a pair of optical targets 114 are mounted to the rear wheels 13, 15 of the vehicle. Next, a pair of cameras 112 are secured to the extension bars 106R and 106L of the vehicle service apparatus 100, and are positioned such that the optical targets 114 are each within the field of view of a respective camera 112. As previously described, the cameras 112 are each operatively coupled to a vehicle wheel alignment system computer 31, or to another suitable image processing system i.e., a position guidance system, which may be independent of a vehicle wheel alignment system. Improved accuracy can be achieved with a bubble level or other suitable sensor or method is provided to assist in alignment of the cameras 112 such that the optical axis (z-axis) of each camera 112 is parallel to the ground or surface upon which the vehicle is disposed.

The steps of this method assume that the steer axis of the vehicle service apparatus 100 is the angle bisector of the mounting shaft axis for each camera 112, or that any misalignment of the steer axis relative to the mounting sockets 108 on the left and right sides of the vehicle service apparatus 100 has been determined in a conventional manner and suitable compensation or calibration calculations performed, such as described in U.S. Pat. No. 5,724,128 to January.

With the cameras 112 aligned, the images of the associated optical targets are acquired and processed in a conventional manner, including target compensation if required, to identify an axis of rotation for each wheel of the vehicle on which the targets are secured. Preferably, the axis of rotation identified for the left rear wheel is compared with the mounting shaft axis of the left side camera in the left side camera coordinate system. Similarly, the axis of rotation for the right rear wheel is compared with the mounting shaft axis of the right side camera in the right side camera coordinate system. The position and orientation of the vehicle service apparatus 100 is then adjusted until the angle differences between the wheel axis of rotation and the camera mounting shafts on each side are equivalent, at which point the vehicle service apparatus 100 is aligned relative to the rear thrust line of the vehicle.

In an alternate method of the present invention, the initial steps are identical to those set forth above, however, optical targets 114 are disposed on the extension arms 106R and 106L of the vehicle service apparatus 100 in place of the cameras 112. The vehicle service apparatus 100 and optical targets 114 are positioned in front of, and approximately in the center of, the vehicle such that each optical targets 114 is within the field of view of at least one camera operatively coupled to the vehicle wheel alignment system 10.

Images acquired of the optical targets 114 are compared with the previously computed target relationships and wheel alignment angles to determine the position and orientation of the vehicle service apparatus 100 in a common coordinate system. Preferably, a common axis between the two optical targets 114 is established perpendicular to a steer axis for the vehicle service apparatus 100. Once the position and orientation of the vehicle service apparatus 100 is identified, the computer 31 provides the operator with instructions for adjusting the position and orientation of the vehicle service apparatus 100 such that the steer axis is aligned relative to a predetermined vehicle wheel alignment angle or other measurement, such as the rear axle thrust line.

Those of ordinary skill in the art will recognize that the instructions may be provided in numerical format, or may be provided visually, such as through a "live" bar graph representative of the amount of movement required to position the vehicle service apparatus 100 in the desired location, such as shown in U.S. Reissue Pat. No. 33,144 to Hunter et al., which is herein incorporated by reference. With the vehicle service apparatus 100 disposed at the desired position and orientation relative to the vehicle, the operator can conduct further necessary vehicle services, such as the alignment of vehicle mounted radar collision avoidance components, in the conventional manner.

Those of ordinary skill in the art will further recognize that the selection of the placement locations for the cameras and optical targets may be interchanged within the scope of the present invention so long as a positional relationship between the vehicle service apparatus 100 and the vehicle can be determined. For example, it is considered within the scope of the present invention to mount forward-looking cameras on the rear vehicle wheels, and to obtain images of optical targets disposed on a vehicle service apparatus 100 in front of the vehicle. Images acquired by these cameras can be processed to determine a positional relationship between a computed vehicle rear thrust line and the vehicle service apparatus 100.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An improved machine vision vehicle wheel alignment system having at least one camera, a computer operatively coupled to the at least one camera, the computer configured with vehicle wheel alignment software, and at least one optical target configured for attachment to a vehicle within a field of view of the at least one camera, wherein the improvement comprises:

at least one additional camera mounted to a positionable vehicle service apparatus which is separate from the alignment system and is positionable relative to the vehicle, said at least one additional camera operatively coupled to the computer, said at least one additional camera disposed to include at least one optical target in an associated field of view; and wherein said computer is further configured to utilize images of the at least one optical target received from said at least one additional camera to guide the placement of said positionable vehicle service apparatus relative to the vehicle.

2. The improved machine vision vehicle wheel alignment system of claim 1 wherein said computer is further configured to guide the placement of the positionable vehicle service apparatus relative to a rear thrust line of said associated vehicle.

3. The improved machine vision vehicle wheel alignment system of claim 1 wherein said positionable vehicle service apparatus is a vehicle collision avoidance system alignment fixture.

4. An improved machine vision vehicle wheel alignment system having at least one camera, a computer operatively coupled to the at least one camera, the computer configured with vehicle wheel alignment software, and at least one optical target configured for attachment to a vehicle within a field of view of the at least one camera, wherein the improvement comprises:

at least one additional optical target configured for attachment to a positionable vehicle service apparatus within a field of view of the at least one camera, said positionable vehicle service apparatus separate from the alignment system and positionable relative to the vehicle; and wherein said computer is further configured to utilize images of the at least one additional optical target received from the at least one camera to guide the placement of said positionable vehicle service apparatus relative to the associated vehicle.

5. The improved machine vision vehicle wheel alignment system of claim 4 wherein said computer is further configured to guide the placement of the positionable vehicle service apparatus relative to a rear thrust line of said associated vehicle.

6. The improved machine vision vehicle wheel alignment system of claim 4 wherein said positionable vehicle service apparatus is a collision avoidance system alignment fixture.

7. The improved machine vision vehicle wheel alignment system of claim 4 wherein a field of view of the at least one camera is adjustable to selectively view the at least one optical target configured for attachment to a vehicle and to selectively view said at least one additional optical target configured for attachment to said positionable vehicle service apparatus.

8. A method for aligning a positionable vehicle service apparatus relative to an associated vehicle utilizing a separate machine vision vehicle wheel alignment system having at least one camera, a computer operatively coupled to the at least one camera, the computer configured with vehicle wheel alignment software, and at least one optical target configured for attachment to a vehicle within a field of view of the at least one camera, comprising the steps of:

mounting the at least one optical target on the associated vehicle in the field of view of the at least one camera;

acquiring, at the computer, data representative of the position and orientation of one or more components of the associated vehicle from one or more images of the at least one optical target acquired by the at least one camera;

mounting at least one additional camera on the positionable vehicle service apparatus, said at least one additional camera operatively coupled to the computer and having a field of view including the at least one optical target;

acquiring, at the computer, data representative of the position and orientation of the positionable vehicle service apparatus relative to the associated vehicle from one or more images of the at least one optical target acquired by said at least one additional camera; and guiding placement of the positionable vehicle service apparatus relative to the associated vehicle utilizing said acquired position and orientation of the one or more components of the associated vehicle and said acquired position and orientation of the positionable vehicle service apparatus.

9. The method for aligning a vehicle service apparatus of claim 8 further including the step of determining the rear thrust line of the associated vehicle from said acquired data representative of the position and orientation of one or more components of the associated vehicle; and wherein the step of guiding further includes guiding the placement of the positionable vehicle service apparatus relative to said rear thrust line of the associated vehicle.

10. A method for aligning a positionable vehicle service apparatus relative to an associated vehicle utilizing a separate machine vision vehicle wheel alignment system having at least one camera, a computer operatively coupled to the at least one camera, the computer configured with vehicle wheel alignment software, and at least one optical target configured for attachment to a vehicle within a field of view of the at least one camera, comprising the steps of:

mounting the at least one optical target on the associated vehicle in the field of view of the at least one camera;

acquiring, at the computer, data representative of the position and orientation of one or more components of the vehicle from one or more images of the at least one optical target acquired by the at least one camera;

mounting one or more additional optical targets on the positionable vehicle service apparatus, said one or more additional optical targets in a field of view of the at least one camera;

acquiring, at the computer, data representative of the position and orientation of the positionable vehicle service apparatus relative to the associated vehicle from one or more images of the at least one additional optical targets acquired by the at least one camera; and guiding placement of the positionable vehicle service apparatus relative to the associated vehicle utilizing said acquired position and orientation of the one or more components of the associated vehicle and said acquired position and orientation of the positionable vehicle service apparatus.

11. The method for aligning a vehicle service apparatus of claim 10 further including the step of determining the rear thrust line of the associated vehicle from the acquired data representative of the position and orientation of one or more components of the associated vehicle; and wherein the step of guiding further includes guiding the placement of the positionable vehicle service apparatus relative to said rear thrust line of the associated vehicle.

* * * * *

UNITED STATES PATENT AND TRADEMARK OFFICE
CERTIFICATE OF CORRECTION

PATENT NO. : 7,382,913 B2  Page 1 of 1
APPLICATION NO. : 10/646644
DATED : June 3, 2008
INVENTOR(S) : Daniel R. Dorrance et al.

It is certified that error appears in the above-identified patent and that said Letters Patent is hereby corrected as shown below:

Title Pg, Item (75) Inventors, the last name of the first inventor was misspelled as "Dorranc". The correct spelling should be -- Dorrance --.

Signed and Sealed this

Fifth Day of August, 2008

JON W. DUDAS
*Director of the United States Patent and Trademark Office*